No. 665,297. Patented Jan. 1, 1901.
P. S. WITHINGTON.
VEHICLE REACH.
(Application filed May 9, 1900.)

(No Model.)

WITNESSES:

INVENTOR
P. S. Withington.
BY
ATTORNEYS

THE NORRIS PETERS CO., PHOTO-LITHO., WASHINGTON, D. C.

UNITED STATES PATENT OFFICE.

PETER STANTON WITHINGTON, OF SLACK, WYOMING, ASSIGNOR OF ONE-HALF TO CHARLES BINGHAM HOLMES, OF SAME PLACE.

VEHICLE-REACH.

SPECIFICATION forming part of Letters Patent No. 665,297, dated January 1, 1901.

Application filed May 9, 1900. Serial No. 16,054. (No model.)

*To all whom it may concern:*

Be it known that I, PETER STANTON WITHINGTON, residing at Slack, in the county of Sheridan and State of Wyoming, have made certain new and useful Improvements in Vehicles, of which the following is a specification.

My invention is an improvement in vehicles, and particularly in the reach or coupling, and has for an object to provide a simple, durable, and easily-applied reach of great strength and whose application and connection will not weaken the other parts of the vehicle.

The invention consists in certain novel constructions and combinations of parts, as will be hereinafter described and claimed.

Figure 4:
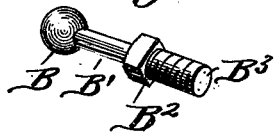
Figure 1:
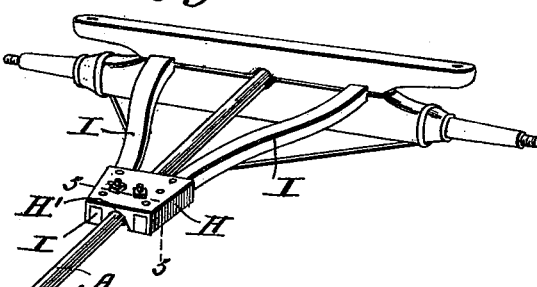
Figure 5:
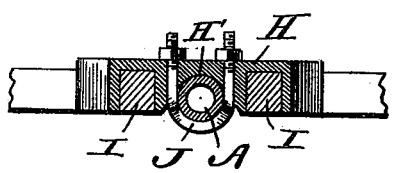
Figure 2:
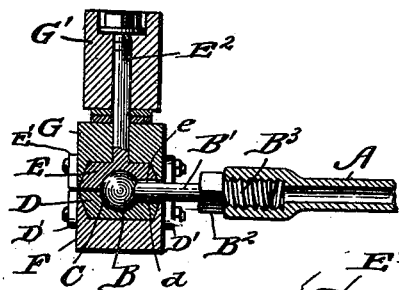
Figure 2:
Figure 3:
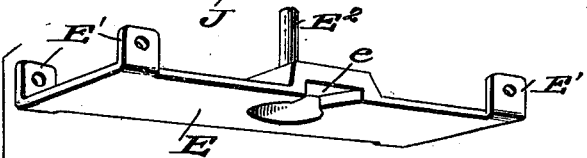

In the drawings, Figure 1 is a perspective view of my invention as in use. Fig. 2 is a side view, partly in section, of the reach and its connections. Fig. 3 is a detail perspective view of the socket-plates. Fig. 4 is a detail perspective view of the ball-section of the reach, and Fig. 5 is a detail cross-section on about line 5 5 of Fig. 1.

The reach A is made of tubing of size suitable to the wagon or other vehicle, and instead of a king-bolt connection with the front axle I employ a ball B at the front end of the reach, fitted in a ball-socket at C, the ball to be placed in the socket when the wagon is made. So I prefer to make the reach in sections, the ball B having a short shank B', threaded or otherwise suitably connected with the main portion of the reach. As shown, the shank B' has an angular portion $B^2$ to receive a wrench and a threaded end $B^3$ to turn into a threaded socket on the main portion of the reach. The ball-section B' of the reach may be made of any desired length; but usually I make it to extend about halfway from the front axle to the front hounds, as shown.

In providing the ball-socket C, I prefer to form it partly in two plates D and E, secured, respectively, to the axle F and the sand-board G and fitted face to face with the hemispherical sockets in their abutting faces and having outlet-recesses $d$ and $e$, through which the shank B' projects. The plates D and E have flanges D' and E', which overlap the edge of the axle and sand-board, thus strengthening the connection and relieving the strain and wear on the bolts for receiving and keeping the plates D and E in place. The plate E is provided with a central bolt $E^2$, which extends up through the sand-board G and bolster G' and is secured with a washer and nut to hold the bolster, the nut being countersunk in the bolster, as shown.

The rear coupling may be similar to the front one, before described, except that I provide a plate H, having a concave seat H' for the reach and flanges for the hounds I, so the reach may be tightly held by the clip J or in other suitable manner.

In operation the improved reach rocks readily in the front axle and will allow a wheel to pass over an obstruction or drop in a hole or rut without breaking or twisting the reach or coupling-pole. Further, either end of the vehicle may be tipped over without injuring or disturbing the other end of or splitting or otherwise injuring the reach. The draft of the vehicle will also be lightened, there being no friction or binding on the reach. Furthermore, the axle is not weakened, as is the case where a hole is formed for a king-bolt, as no hole is required in the improved construction.

While the improvement is shown in connection with a gas-pipe or tubular reach, it manifestly can be applied to any other form of reach, and it should also be understood that other forms of universal joint or swivel than a ball and socket are within the broad principles of my invention.

The reach can be adjusted to any desired length by adding or removing sections and, being free of bolt-holes, possesses greater strength than the ordinary reach.

In the rear coupling, the grip being perfectly solid and stationary, there is no wear, and the rear connection can be easily changed to any desired point on the reach.

Having thus described my invention, what I claim as new, and desire to secure by Letters Patent, is—

1. The combination substantially as described of the axle and sand-board and bolster, the plates secured to the opposing faces thereof and having flanges overlapping the edges of said axle and sand-board and provided in their inner faces with hemispherical recesses forming a ball-socket, the bolt extending from the upper plate upwardly through the sand-board and bolster, and the tubular reach having a section provided with a ball fitting in the ball-socket of the axle, an angular wrench portion and a threaded end for connection with the main portion of the reach substantially as set forth.

2. The combination of the reach having the main section and at its front end the ball-section threaded to the main section and provided with a ball and with an angular portion by which it may be turned, and the devices providing the socket for said ball substantially as set forth.

3. The combination of the reach having a ball, the front axle and sand-board and the socket-sections secured thereto and receiving the ball, the upper section being provided with the upwardly-extended bolt, substantially as set forth.

PETER STANTON WITHINGTON.

Witnesses:
   ISAAC K. MCNUTT,
   HALLET S. WITHINGTON.